(12) United States Patent
Beaulieu et al.

(10) Patent No.: US 8,348,295 B2
(45) Date of Patent: Jan. 8, 2013

(54) TWO-WHEELED VEHICLE WITH REAR SUSPENSION

(75) Inventors: Cyril Beaulieu, Lille (FR); Zigor Garate, Hellemmes (FR)

(73) Assignee: Decathlon, Villeneuve d'Ascq (FR)

( * ) Notice: Subject to any disclaimer, the term of this patent is extended or adjusted under 35 U.S.C. 154(b) by 0 days.

(21) Appl. No.: 12/023,189

(22) Filed: Jan. 31, 2008

(65) Prior Publication Data

US 2008/0217882 A1 Sep. 11, 2008

(30) Foreign Application Priority Data

Feb. 5, 2007 (FR) ...................................... 07 53060

(51) Int. Cl.
*B62K 3/02* (2006.01)
(52) U.S. Cl. ........................................ 280/284; 280/283
(58) Field of Classification Search ................. 280/283, 280/284
See application file for complete search history.

(56) References Cited

U.S. PATENT DOCUMENTS

| | | | |
|---|---|---|---|
| 5,335,929 A * | 8/1994 | Takagaki et al. ............. | 280/283 |
| 5,611,557 A * | 3/1997 | Farris et al. ..................... | 280/275 |
| 6,161,858 A * | 12/2000 | Tseng ......................... | 280/281.1 |
| 6,244,610 B1 * | 6/2001 | Kramer-Massow .......... | 280/283 |
| 6,712,374 B2 * | 3/2004 | Assier ........................... | 280/284 |
| 6,969,081 B2 * | 11/2005 | Whyte .......................... | 280/284 |
| 2001/0024024 A1 | 9/2001 | Klassen et al. | |
| 2004/0061305 A1 * | 4/2004 | Christini ....................... | 280/284 |
| 2008/0054595 A1 * | 3/2008 | Lu ................................. | 280/284 |
| 2008/0277900 A1 * | 11/2008 | I ..................................... | 280/283 |
| 2009/0001686 A1 * | 1/2009 | Currie ........................... | 280/285 |
| 2009/0102158 A1 * | 4/2009 | Antonot ........................ | 280/284 |
| 2010/0102531 A1 * | 4/2010 | Graney et al. ................. | 280/284 |

FOREIGN PATENT DOCUMENTS

| | | |
|---|---|---|
| DE | 202006013473 | 12/2006 |
| FR | 2827831 | 1/2003 |
| GB | 114014 | 3/1918 |
| WO | WO 2005030565 A1 * | 4/2005 |
| WO | WO 2006005687 A1 * | 1/2006 |

* cited by examiner

*Primary Examiner* — Tashiana Adams
*Assistant Examiner* — Daniel Yeagley
(74) *Attorney, Agent, or Firm* — Ladas & Parry LLP

(57) ABSTRACT

A two-wheeled vehicle, in particular a bicycle, with a rear suspension that includes a front chassis supporting a bottom bracket wheel, and a rear oscillating assembly supporting a rear drive wheel. The rear oscillating assembly is attached to the front chassis by a shock-absorber system, a top pivoting link with two pivot points at top and bottom, and a bottom pivoting link with two pivot points at rear and front. The top and bottom pivot points connect the top pivoting link to the front chassis and to the rear oscillating assembly respectively. The rear and front pivot points connect the bottom pivoting link to the front chassis and to the rear oscillating assembly respectively. Thus, during the compression of the shock-absorber system, the top pivoting link oscillates in relation to the chassis, and about an axis that is perpendicular to the chain line.

26 Claims, 3 Drawing Sheets

TWO-WHEELED VEHICLE WITH REAR SUSPENSION

BACKGROUND OF THE INVENTION

Figure 1:
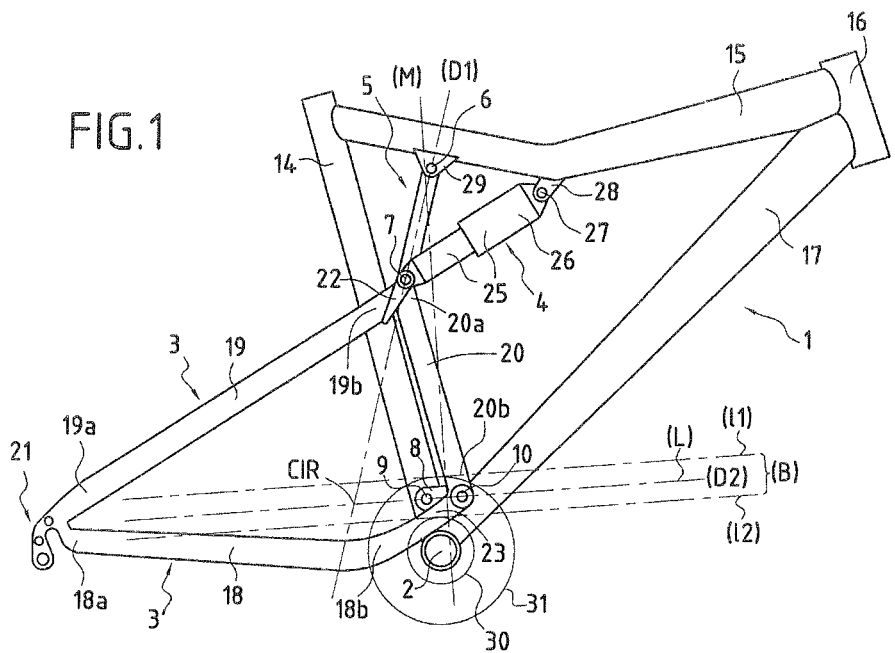

The subject of this present invention is a two-wheeled vehicle with rear suspension. It finds its particular application in the field of bicycles with rear suspension, and more particularly of "mountain bikes" with rear suspension.

Conventionally, a mountain bike can have two suspensions, namely a front suspension and a rear suspension. The front suspension can consist of a telescopic fork. For its part, the rear suspension includes an oscillating assembly and a shock-absorber system. The oscillating assembly, which supports the rear wheel, is connected to the front mountain bike chassis by one or more pivoting links. The function of the shock-absorber system is to act as the elastic suspension of the mountain bike chassis, supporting the user while also absorbing the shocks that result from the bouncing of the rear wheel. The function of the pivoting link or links is to guide the bouncing motion of the rear wheel caused by the irregularities of the terrain.

In a first type of rear suspension, the bottom bracket wheel forms an integral part of the oscillating assembly, so that the suspension has no direct influence on the transmission. In fact, regardless of the bouncing of the rear wheel, the distance between the bottom bracket wheel and the axis of the wheel remains constant.

In a second type of rear suspension, the bottom bracket wheel forms an integral part of the chassis, so that the suspension influences the transmission. In fact, as the rear wheel bounces, a variation is observed in the distance between the bottom bracket wheel and the axis of the rear wheel.

This interaction between the suspension and the transmission can provoke what is usually referred to as the pumping effect, which takes the form of an unwanted movement of the chassis, which sinks and rises under the effect of vigorous pedalling.

More precisely, the variation in the chain length as the rear wheel bounces can affect the transmission. In fact, the tension of the chain can influence the suspension and induce the aforementioned pumping effect.

One is already familiar, in particular from document FR 2 827 831, with two-wheeled vehicles with rear suspension, and with two pivoting links, in which the bottom bracket wheel forms an integral part of the front chassis. The rear suspension is composed of a first short rigid bar constituting the first pivoting link, and of a second short rigid bar or a circular eccentric part constituting the second pivoting link, as well as a shock-absorber system. The two pivoting links each connect the oscillating assembly supporting the rear wheel to the front chassis.

With mountain bikes that are equipped with such suspension systems, the top pivot point of the first pivoting link connects the latter to the rear oscillating assembly, and its bottom pivot point connects it to the front chassis.

The problem that then arises is that the suspension system is effective against the pumping effect only for part of the movement of the rear wheel.

In fact, the movement of the virtual pivot point, which is also known as the instantaneous centre of rotation, defined as the intersection of the straight line passing through the two pivot points of the first pivoting link and the straight line passing through the two pivot points of the second pivoting link, is offset from the chain line, from the front to the rear.

Now if this instantaneous centre of rotation is offset upward from the chain line, the transmission tends to harden the suspension by compressing it, and therefore induces the pumping effect.

These systems therefore do not allow the instantaneous centre of rotation to be kept within a space that is sufficiently close to the chain line, and therefore do not adequately limit the pumping effect, throughout the full movement of the rear wheel and during compression or decompression of the shock-absorber system.

The purpose of the invention is therefore to provide a solution to the aforementioned problem, amongst others.

According to a first aspect, the invention therefore relates to a two-wheeled vehicle, in particular a bicycle or a mountain bike, equipped with rear suspension.

The rear suspension includes a front chassis supporting a bottom bracket wheel, and a rear oscillating assembly supporting a rear drive wheel. The rear oscillating assembly is attached to the front chassis by a shock-absorber system, by a top pivoting link having a top pivot point and a bottom pivot point, and by a bottom pivoting link having a rear pivot point and front pivot point.

Characteristically, the top pivot point connects the top pivoting link to the front chassis, the bottom pivot point connects this top pivoting link to the rear oscillating assembly, the rear pivot point connects the bottom pivoting link to the front chassis, and the front pivot point connects the bottom pivoting link to the rear oscillating assembly, so that, during the compression of the shock-absorber system, the top pivoting link oscillates in relation to the chassis, about an axis that is more-or-less perpendicular to the chain line, and the trajectory of the point of intersection between the straight line passing through the two top and bottom pivot points and the straight line passing through the two front and rear pivot points moves from the rear toward the front of the vehicle within a band that is more-or-less parallel to and at a minimum distance from the chain line.

Implementation variants are presented below, and these can be considered alone or in combination.

The straight line passing through the two rear and front pivot points is more-or-less parallel to the chain line.

The bottom pivoting link takes the form of a circular eccentric part in the form of a canister supporting an eccentric axle on either side of the latter, or by a connecting rod.

The rear pivot point is located between two straight lines that are more-or-less parallel to the chain line, and respectively tangential to the smallest and largest chain sprocket wheels.

The intersection point between the straight line passing through the two top and bottom pivot points and the straight line passing through the two front and rear pivot points, remains behind the axis of the bottom bracket wheel during the first 30%, and preferably the first 25% of the compression of the shock-absorber system.

The top pivoting link takes the form of a connecting rod.

The top pivot point is located close to the rear end of the top tube forming the top front part of the front chassis.

The bottom pivot point is located at or close to the junction between the strut forming the top rear part of the rear oscillating assembly, and the bracing tube forming the top front part of this rear oscillating assembly.

The rear pivot point is located close to the bottom end either of the saddle tube forming the front chassis or of the diagonal tube forming the bottom front part of the front chassis.

The front pivot point is located close to or at the junction between the bracing tube forming the front part of the rear oscillating assembly and the base tube forming the bottom rear part of this rear oscillating assembly.

The invention therefore advantageously allows the instantaneous centre of rotation to be kept at a minimum distance from the chain line, thus limiting the pumping phenomenon throughout the full movement of the rear wheel during compression or decompression of the shock-absorber system.

BRIEF DESCRIPTION OF THE DRAWING FIGURES

Figure 3:
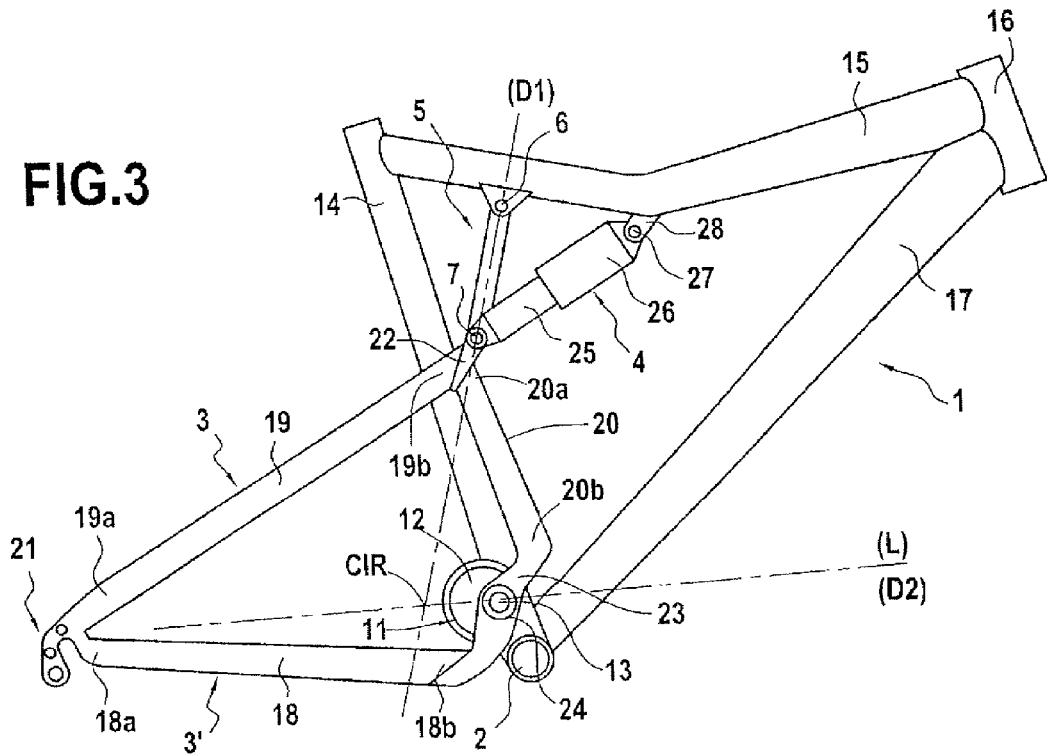
Figure 4:
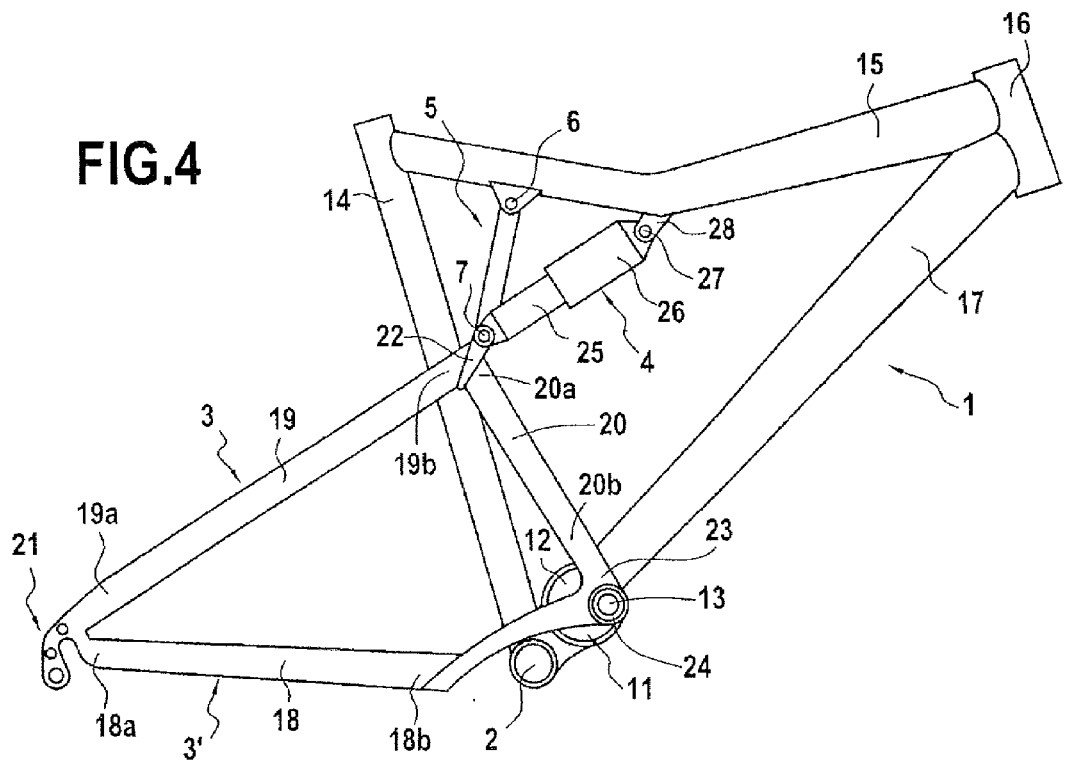
Figure 5:
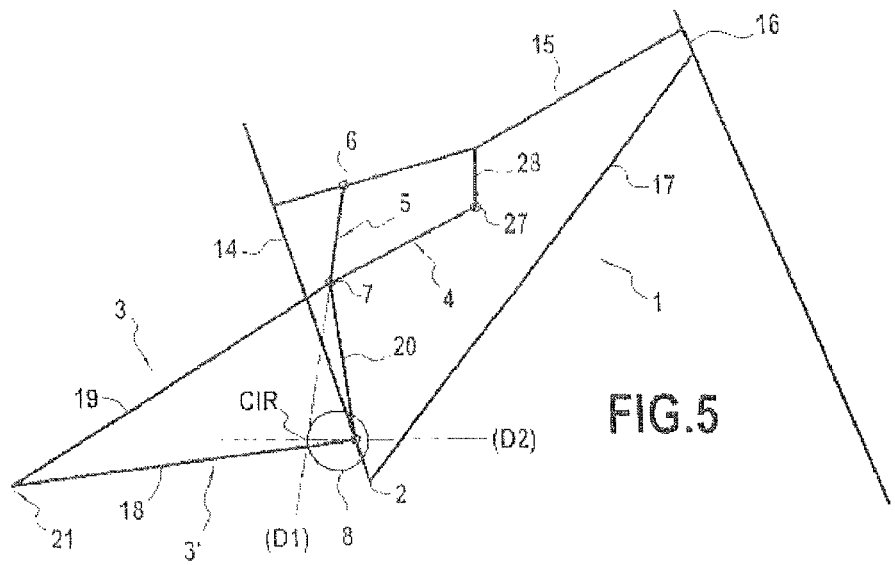
Figure 6:
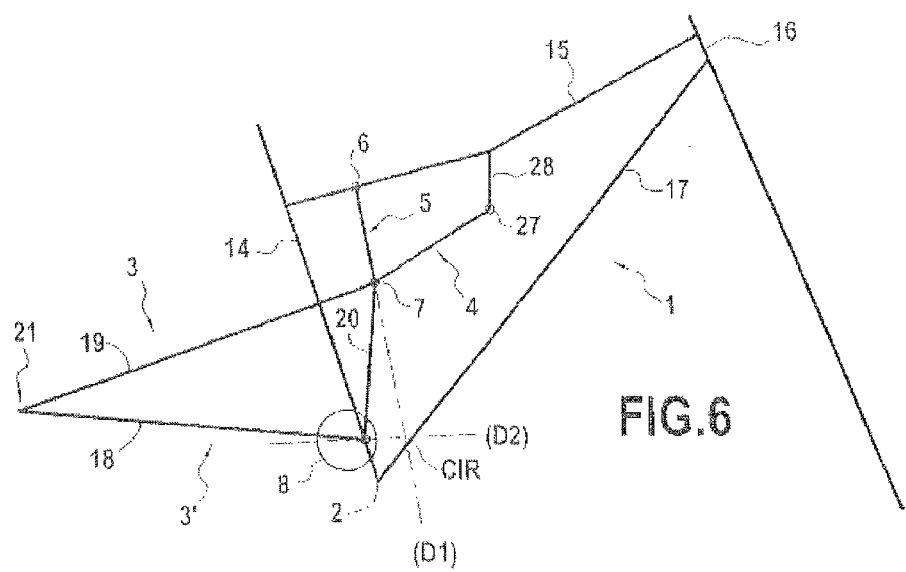
Figure 7:
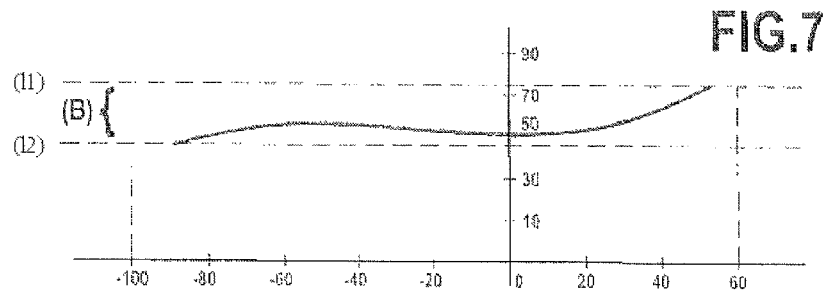

Other characteristics and advantages of the invention will appear more clearly and more fully on reading the description that follows of the preferred implementation variants of the system, which are given by way of non-limiting examples and with reference to the following appended drawings:

FIGS. 1 to 4: schematically represent a mountain bike in a partial view, in particular the front chassis and the rear oscillating assembly, FIG. 5: schematically represents the mountain bike of FIGS. 1 to 4 in its static unloaded state, FIG. 6: schematically represents the mountain bike of FIGS. 1 to 4 in its static loaded state, FIG. 7: represents the trajectory of the instantaneous centre of rotation in the plane of the front chassis.

DETAILED DESCRIPTION OF THE PREFERRED EMBODIMENTS

The mountain bike with rear suspension that is partially represented in FIGS. 1 to 4 includes a front chassis 1, of relatively conventional structure, and a rear oscillating assembly 3.

The front chassis 1 is composed of four tubes, namely the saddle tube 14, the top tube 15, the steering tube 16 and the diagonal tube 17. The bottom bracket wheel 2 is mounted in a housing formed at the bottom end of the saddle tube 14, at the intersection of the latter with the diagonal tube 17.

The top tube cannot be straight, as shown in FIGS. 1 to 4, but includes an angle.

The rear oscillating assembly 3 supports the rear drive wheel (not shown). It is composed of two subassemblies 3', one of which is visible in FIG. 1, placed on either side of the median plane of the front chassis 1 and connected to each other, in particular at the two pivoting links, as will be explained below.

Each subassembly 3' has a generally triangular configuration, with a base tube 18, a strut 19 and a bracing tube 20. The rear parts 18a, 19a of the base tube 18 and of the strut 19 are terminated by a connecting piece 21 that serves as a mounting for the rear wheel.

The front part 19b of the strut 19 and the top part 20a of the bracing tube 20 are connected by a part 22 that acts as the apex of the triangle formed by the three tubes 18, 19, 20.

The front part 19b of the base tube 18 and the bottom part 20b of the bracing tube 20 are connected by a part 23 which, in the example represented in FIGS. 1 to 4, does not constitute one of the apexes of the triangle but rather acts as one small side of a quadrilateral whose three other sides are formed by the three tubes 18, 19, 20. Naturally this embodiment of the invention is not exclusive, and part 23 can equally well be a connecting piece similar to the part 22 between the strut 19 and the bracing tube 20.

Figure 2:
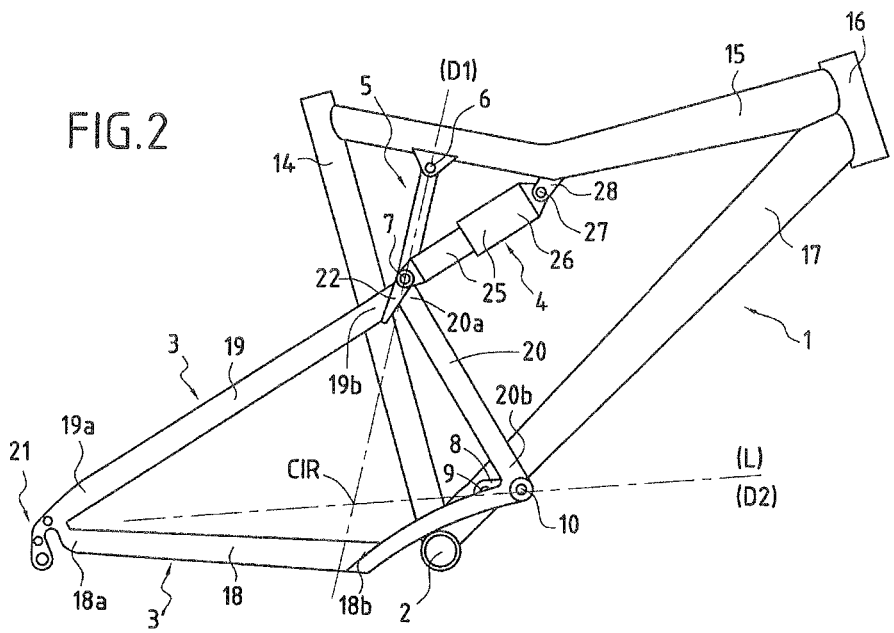

This connecting piece 23 can be a separate part from the bracing 20 and base 18 tubes, as represented in FIGS. 3 and 4, or indeed can constitute an extension of the end of the base tube 18, as represented in FIGS. 1 and 2.

The rear oscillating assembly 3 is connected to the front chassis 1 by two pivoting links 5, 8 and by a shock-absorber system 4.

The bottom pivoting link 8 can be composed of a circular eccentric part 11, as represented in FIGS. 3 and 4, or by a simple connecting rod 8, as represented in FIGS. 1 and 2.

In both cases, this bottom pivoting link 8 has a rear pivot point 9 and front pivot point 10.

The rear pivot point 9 connects the bottom pivoting link 8 to the front chassis 1, close to the bottom end of the saddle tube 14 in the examples represented in FIGS. 1 and 3 respectively (link not referenced in FIG. 3).

In the examples represented respectively in FIGS. 2 and 4, the rear pivot point 9 connects the bottom pivoting link 8 to the front chassis 1 close to the bottom end or rear end of the diagonal tube 17 (link not referenced in FIG. 4).

For its part, the front pivot point 10 connects the bottom pivoting link 8 to the rear oscillating assembly 3, at or close to the junction between part 23, which connects the base tube 18 and the bracing tube 20, and the bottom part of the bracing tube 20.

In the case of the embodiments with the circular eccentric part 11, as represented in FIGS. 3 and 4, the front pivot point 10 is coincident with the eccentric axle 13.

In addition, the top pivoting link 5 is composed of a connecting rod 5, which can be formed by a simple bar positioned in the median plane of the front chassis 1 or parallel to the latter.

This top pivoting link 5 has a top pivot point 6 and a bottom pivot point 7.

The top pivot point 6 connects the top pivoting link 5 to the front chassis 1, by means of a support part 29 (of the U-bracket type, or formed from two lateral brackets, framing the top pivot point 6), close to the rear end of the top tube 15, and therefore close to the junction of this top tube 15 with the saddle tube 14.

For its part, the bottom pivot point 7 connects the top pivoting link 5 to the rear oscillating assembly 3 at or close to the part 22 forming the coupling between the strut 19 and the bracing tube 20.

In the case of the embodiments represented in FIGS. 3 and 4, the circular eccentric part 11 includes a canister 12, which is mobile in rotation about an axis perpendicular to the median plane of the chassis 1, and which is equipped with an eccentric axle 13. This eccentric axle 13, mounted in the canister 12, projects from either side of the front chassis 1 and is attached to the rear oscillating assembly 3 by a pivot link 24.

Reference can be made to document FR 2 827 831 for additional constructional details relating to the circular eccentric part 11 and its mounting.

The shock-absorber system 4 is composed of a jack 4 whose body 26 is fixed to the front chassis 1 by a pivot link 27 and whose shaft 25 is fixed to the rear oscillating assembly 3 by another pivot link. In the example illustrated in FIGS. 1 to 4, the shaft 25 of the jack 4 is fixed to the same pivot link as the bottom end of the connecting rod 5 with the rear oscillating assembly 3, meaning at the bottom pivot point 7. Like for the connecting rod 5, the body of the jack 26 is fixed to the top tube 15 by a support part 28, of the U-bracket type, or which can be formed from two lateral brackets, framing the pivot point 27.

In this embodiment, the plane of the connecting rod 5 is slightly offset in relation to the median plane of the front chassis 1.

In a conventional manner, as with any rear suspension, the bouncing of the rear wheel is limited by the travel of the shock-absorber system 4, in this case of the jack 4. In the static situation, meaning when the mountain bike is at rest, with no added load, the shaft 26 of the jack is fully extended. In this configuration, which is illustrated in FIG. 5, the direction of action of the shaft 25 of the jack 4 is more-or-less in the extension of the struts 19 of the rear oscillating assembly 3.

When the mountain bike is in a static loaded state, as illustrated in FIG. 6, supporting only the weight of an average user, the result at the jack 4 is a travel of the order of 25%. In other words, the distance between the two pivot links 7, 27 reduces by 25% in relation to its value in the static unloaded state. As a result of this movement of the shaft 25 in the body 26 of the jack 4, there is an associated movement of the rear oscillating element 3 by the double pivoting firstly of the front pivot point 10 of the bottom pivoting link 8 (the eccentric axle 13 in the embodiments illustrated in FIGS. 3 and 4) and secondly of the connecting rod 5 or top pivoting link 5, also causing a variation of the angle between the direction of action of the shaft 25 of the jack 4 and the along which lies the top tube 15 or a part of this top tube 15 when the latter is angled.

It can be seen that during the compression of the shock-absorber system 4, the top pivoting link 5 oscillates in relation to the front chassis 1. This oscillation occurs about an axis (M) passing through the top pivot point 6, more-or-less perpendicular to the chain line (L), meaning the line along which the chain links are aligned.

The instantaneous centre of rotation ICR is defined as being the point of intersection of the straight line (D1) passing through the two top 6 and bottom 7 pivot points and the straight line (D2) passing through the two rear 9 and front 10 pivot points. In FIG. 1, this straight line (D2) is substantially coincident with the chain line (L).

More generally, this straight line (D2) is more-or-less parallel to the chain line (L).

This instantaneous centre of rotation ICR moves from the rear toward the front of the mountain bike during the compression of the shock-absorber system 4, within a band (B) that is more-or-less parallel to, and at a minimum distance from, the chain line (L) as illustrated in FIG. 7. The origin of the graph shown in FIG. 7 corresponds to the axis of the bottom bracket wheel 2, and the graduations on abscissa and ordinate are expressed in mm.

On this graph, the chain line (L) corresponds to a straight line that is more-or-less horizontal, crossing the axis of the ordinates close to the 50 mm graduation or, where appropriate, between the 50 mm graduation and the 90 mm graduation, according to the sprocket wheel (e.g., small, medium, or large) on which it is desired more particularly to locate the anti-pumping effect.

The pumping effect is therefore reduced, in contrast to what happens in the devices of the prior art, in which the movement of the (ICR) occurs from the front to the rear, possibly moving outside of this band (B), and resulting in an excessive pumping effect.

In the examples illustrated above, the rear pivot point 9 is located between two straight lines 11 and 12 (shown in FIGS. 1 and 7) that are more-or-less parallel to the chain line (L), which are respectively tangential to the smallest sprocket wheel 30 and largest chain sprocket wheel 31 (shown in FIG. 1). These two straight lines correspond respectively to the upper limit and the lower limit of the band (B) on the graph of FIG. 7 and shown in FIG. 1.

It can be seen that during the first 25%, or even the first 30%, of the compression of the shock-absorber system 4, the ICR remains behind the axis of the bottom bracket wheel 2.

It should be noted that all of the description above is given by way of examples, and does not limit the invention, in particular regarding the shape and specific dimensions of the different elements of the device of the invention.

The invention claimed is:

1. A two-wheeled vehicle frame equipped with rear suspension and including:
a front chassis equipped with a bottom bracket wheel, and
a rear oscillating assembly equipped with a rear drive wheel,
with said rear oscillating assembly being attached to said front chassis by a shock-absorber system having a top connecting point and a bottom connecting point, by a top pivoting link having a top pivot point and a bottom pivot point, and by a bottom pivoting link having a rear pivot point and a front pivot point, wherein:
the top connecting point connects said shock absorber system to said front chassis,
the bottom connecting point connects said shock absorber system directly to said rear oscillating assembly,
the top pivot point connects said top pivoting link to said front chassis,
the bottom pivot point is located on the rear oscillating assembly and connects said top pivoting link directly to said rear oscillating assembly,
the rear pivot point connects said bottom pivoting link to said front chassis,
the front pivot point connects said bottom pivoting link to said rear oscillating assembly,
wherein the top pivot point is distinct from the top connecting point, and
wherein, during the compression of said shock-absorber system, said top pivoting link oscillates, in relation to said chassis, about an axis that is substantially perpendicular to a chain line, and the trajectory of a point of intersection between a first straight line passing through the two top and bottom pivot points and a second straight line passing through the two rear and front pivot points moves from the rear toward the front of said vehicle within a band that is substantially parallel to and at a minimum distance from said chain line, and wherein the intersection point between the first straight line passing through the two top and bottom pivot points and the second straight line passing through the two rear and front pivot points, remains behind the axis of the bottom bracket wheel during at least the 25% of the compression of the shock-absorber system.

2. The vehicle frame according to claim 1, wherein the second straight line passing through the two rear and front pivot points is substantially parallel to the chain line.

3. The vehicle frame according to claim 1, wherein the bottom pivoting link takes the form of a circular eccentric part in the form of a canister that supports an eccentric axle, or by a connecting rod.

4. The vehicle frame according to claim 1, wherein the rear pivot point is located between two straight lines that are substantially parallel to the chain line, and respectively tangential to the smallest and to the largest chain sprocket wheel.

5. The vehicle frame according to claim 1, wherein the top pivoting link takes form of a connecting rod.

6. The vehicle frame according to claim 1, wherein the top pivot point is located close to the rear end of a top tube forming the top front part of the front chassis.

7. The vehicle frame according to claim 1, wherein the bottom pivot point is located at or close to the junction between a strut forming the top rear part of the rear oscillating assembly, and a bracing tube forming the top front part of said rear oscillating assembly.

8. The vehicle frame according to claim 1, wherein the rear pivot point is located close to the bottom end of a saddle tube forming the rear part of the front chassis.

9. The vehicle frame according to claim 1, wherein the front pivot point is located close to or at the junction between a bracing tube forming the front part of the rear oscillating assembly and a base tube forming the bottom rear part of the said rear oscillating assembly.

10. The vehicle frame according to claim 1, wherein the rear pivot point is located close to the bottom end of a diagonal tube forming the bottom front part of said front chassis.

11. The vehicle according to claim 1, wherein the bottom pivot point is the same as the bottom connecting point.

12. The vehicle according to claim 1, wherein the top pivot point is connected to a top tube of the front chassis.

13. The frame according to claim 1, wherein the intersection point between the first straight line passing through the two top and bottom pivot points and the second straight line passing through the two rear and front pivot points, remains behind the axis of the bottom bracket wheel during the first 30% of the compression of the shock-absorber system.

14. A two-wheeled vehicle equipped with rear suspension and including:
a front chassis equipped with a bottom bracket wheel, and
a rear oscillating assembly equipped with a rear drive wheel,
with said rear oscillating assembly being attached to said front chassis by a shock-absorber system having a top connecting point and a bottom connecting point, by a top pivoting link having a top pivot point and a bottom pivot point, and by a bottom pivoting link having a rear pivot point and a front pivot point, wherein:
the top connecting point connects said shock absorber system to said front chassis,
the bottom connecting point connects said shock absorber system directly to said rear oscillating assembly,
the top pivot point connects said top pivoting link to said front chassis,
the bottom pivot point is located on the rear oscillating assembly and connects said top pivoting link directly to said rear oscillating assembly,
the rear pivot point connects said bottom pivoting link to said front chassis,
the front pivot point connects said bottom pivoting link to said rear oscillating assembly,
wherein the top pivot point is distinct from the top connecting point,
wherein, during the compression of said shock-absorber system, said top pivoting link oscillates, in relation to said chassis, about an axis that is substantially perpendicular to the chain line, and the trajectory of a point of intersection between a first straight line passing through the two top and bottom pivot points and a second straight line passing through the two rear and front pivot points moves from the rear toward the front of said vehicle within a band that is substantially parallel to and at a minimum distance from said chain line
and wherein the intersection point between the first straight line passing through the two top and bottom pivot points and the second straight line passing through the two rear and front pivot points, remains behind the axis of the bottom bracket wheel during at least the first 25% of the compression of the shock-absorber system.

15. The vehicle according to claim 14, wherein the second straight line passing through the two rear and front pivot points is substantially parallel to the chain line.

16. The vehicle according to claim 14, wherein the bottom pivoting link takes the form of a circular eccentric part in the form of a canister that supports an eccentric axle, or by a connecting rod.

17. The vehicle according to claim 14, wherein the rear pivot point is located between two straight lines that are substantially parallel to the chain line, and respectively tangential to the smallest and to the largest chain sprocket wheel.

18. The vehicle according to claim 14, wherein the top pivoting link takes form of a connecting rod.

19. The vehicle according to claim 14, wherein the top pivot point is located close to the rear end of a top tube forming the top front part of the front chassis.

20. The vehicle according to claim 14, wherein the bottom pivot point is located at or close to the junction between a strut forming the top rear part of the rear oscillating assembly, and a bracing tube forming the top front part of said rear oscillating assembly.

21. The vehicle according to claim 14, wherein the rear pivot point is located close to the bottom end of a saddle tube forming the rear part of the front chassis.

22. The vehicle according to claim 14, wherein the front pivot point is located close to or at the junction between a bracing tube forming the front part of the rear oscillating assembly and a base tube forming the bottom rear part of the said rear oscillating assembly.

23. The vehicle according to claim 14, wherein the rear pivot point is located close to the bottom end of a diagonal tube forming the bottom front part of said front chassis.

24. The vehicle according to claim 14, wherein the intersection point between the first straight line passing through the two top and bottom pivot points and the second straight line passing through the two rear and front pivot points, remains behind the axis of the bottom bracket wheel during the first 30% of the compression of the shock-absorber system.

25. A two-wheeled vehicle equipped with rear suspension and including:
a front chassis equipped with a bottom bracket wheel, and
a rear oscillating assembly equipped with a rear drive wheel,
with said rear oscillating assembly being attached to said front chassis by a shock-absorber system having a top connecting point and a bottom connecting point, by a top pivoting link having a top pivot point and a bottom pivot point, and by a bottom pivoting link having a rear pivot point and a front pivot point, wherein:
the top connecting point connects said shock absorber system to said front chassis,
the bottom connecting point connects said shock absorber system directly to said rear oscillating assembly and to the bottom pivot point,
the top pivot point connects said top pivoting link to said front chassis,
the bottom pivot point is located on the rear oscillating assembly and connects said top pivoting link directly to said rear oscillating assembly,
the rear pivot point connects said bottom pivoting link to said front chassis,
the front pivot point connects said bottom pivoting link to said rear oscillating assembly,
wherein the top pivot point is distinct from the top connecting point,
wherein, during the compression of said shock-absorber system, said top pivoting link oscillates, in relation to said chassis, about an axis that is substantially perpendicular to the chain line, and the trajectory of a point of intersection between a first straight line passing through the two top and bottom pivot points and a second straight line passing through the two rear and front pivot points moves from the rear toward the front of said vehicle within a band that is substantially parallel to and at a minimum distance from said chain line, wherein the intersection point between the first straight line passing through the two top and bottom pivot points and the second straight line passing through the two rear and front pivot points, remains behind the axis of the bottom bracket wheel during at least the first 25% of the compression of the shock-absorber system.

26. The vehicle according to claim 25, wherein the intersection point between the first straight line passing through the two top and bottom pivot points and the second straight line passing through the two rear and front pivot points, remains behind the axis of the bottom bracket wheel during the first 30% of the compression of the shock-absorber system.

* * * * *